United States Patent
Muddu et al.

(10) Patent No.: US 9,298,417 B1
(45) Date of Patent: Mar. 29, 2016

(54) SYSTEMS AND METHODS FOR FACILITATING MANAGEMENT OF DATA

(75) Inventors: Sudhakar Muddu, Milpitas, CA (US); Christos Tryfonas, San Francisco, CA (US); Anurag Maunder, Fremont, CA (US)

(73) Assignee: EMC CORPORATION, Hopkinton, MA (US)

( * ) Notice: Subject to any disclaimer, the term of this patent is extended or adjusted under 35 U.S.C. 154(b) by 519 days.

(21) Appl. No.: 11/933,111

(22) Filed: Oct. 31, 2007

Related U.S. Application Data (60) Provisional application No. 60/951,908, filed on Jul. 25, 2007, provisional application No. 60/951,912, filed on Jul. 25, 2007, provisional application No. 60/951,913, filed on Jul. 25, 2007, provisional application No. 60/951,915, filed on Jul. 25, 2007, provisional application No. 60/951,916, filed on Jul. 25, 2007.

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)

(58) Field of Classification Search
CPC .................. G06F 17/30707; G06F 17/30867; G06F 17/3061
See application file for complete search history.

(56) References Cited

U.S. PATENT DOCUMENTS

| | | | |
|---|---|---|---|
| 2002/0091686 A1* | 7/2002 | Keith, Jr. | 707/5 |
| 2004/0122835 A1* | 6/2004 | McKibben et al. | 707/100 |
| 2004/0123242 A1* | 6/2004 | McKibben et al. | 715/513 |
| 2005/0240590 A1* | 10/2005 | Shimizu | G06F 17/30067 |
| 2005/0262472 A1* | 11/2005 | Wood | H04L 41/064 717/102 |
| 2006/0031263 A1* | 2/2006 | Arrouye et al. | 707/200 |
| 2006/0048224 A1* | 3/2006 | Duncan et al. | 726/22 |
| 2006/0085750 A1* | 4/2006 | Easton et al. | 715/708 |
| 2006/0100989 A1* | 5/2006 | Chinchwadkar et al. | 707/3 |
| 2006/0149748 A1* | 7/2006 | Yamakawa et al. | 707/10 |
| 2006/0195465 A1* | 8/2006 | Atchison et al. | 707/102 |
| 2007/0038591 A1* | 2/2007 | Haub et al. | 707/1 |
| 2007/0038615 A1* | 2/2007 | Vadon | G06F 17/273 |
| 2007/0038616 A1* | 2/2007 | Guha | G06F 17/30672 |
| 2007/0073651 A1* | 3/2007 | Imielinski | 707/3 |
| 2007/0112900 A1* | 5/2007 | Arrouye et al. | 707/205 |
| 2008/0177701 A1* | 7/2008 | Merritt et al. | 707/3 |

OTHER PUBLICATIONS

U.S. Appl. No. 12/023,931, filed Jan. 31, 2008.
U.S. Appl. No. 12/030,158, filed Feb. 12, 2008.
U.S. Appl. No. 12/030,153, filed Feb. 12, 2008.
U.S. Appl. No. 12/023,941, filed Jan. 31, 2008.
"U.S. Appl. No. 12/098,342", filed Apr. 4, 2008.
"U.S. Appl. No. 12/098,338", filed Apr. 4, 2008.

* cited by examiner

*Primary Examiner* — Tuan A Pham
(74) *Attorney, Agent, or Firm* — Dergosits & Noah LLP; Todd A. Noah (57) ABSTRACT

A system for facilitating management of content data contained in a plurality of files is disclosed. The system may include a data discovery program configured to scan context data pertaining to the content data. The system may also include logic (or a service profile program) configured to determine one or more service profiles. The one or more service profiles may be selected and/or determined by a user or determined based on one or more rules and the current state of the context data. The one or more service profiles may define one or more services to be performed on at least one of one or more files among the plurality of files and at least a portion of the content data and/or the context data.

26 Claims, 8 Drawing Sheets

SYSTEMS AND METHODS FOR FACILITATING MANAGEMENT OF DATA

The present invention claims priority under 35 USC 119(e) to a commonly owned provisionally filed patent application entitled "SYSTEMS AND METHODS FOR FACILITATING MANAGEMENT OF DATA," U.S. Application No. 60/951,908, filed Jul. 25, 2007 by inventors Sudhakar Muddu, Christos Tryfonas, and Anurag Maunder; a commonly owned provisionally filed patent application entitled "SYSTEM AND METHODS FOR HANDLING DATA," U.S. Application No. 60/951,912, filed Jul. 25, 2007 by inventors Sudhakar Muddu, Christos Tryfonas, and Anurag Maunder; a commonly owned provisionally filed patent application entitled "SYSTEM AND METHODS FOR SEARCHING DATA," U.S. Application No. 60/951,913, filed Jul. 25, 2007 by inventors Sudhakar Muddu, Christos Tryfonas, and Anurag Maunder; a commonly owned provisionally filed patent application entitled "SYSTEMS AND METHODS FOR PERFORMING INTEGRATED SEARCHES WITH ACTIONS," U.S. Application No. 60/951,915, filed Jul. 25, 2007 by inventors Sudhakar Muddu, Christos Tryfonas, and Anurag Maunder; and a commonly owned provisionally filed patent application entitled "SYSTEMS AND METHODS FOR MANAGING FILE MOVEMENT," U.S. Application No. 60/951,916, filed Jul. 25, 2007 by inventors Sudhakar Muddu, Christos Tryfonas, and Anurag Maunder, all of which are incorporated herein by reference.

BACKGROUND OF THE INVENTION

The present invention relates to management and utilization of data, including unstructured data. Unstructured data generally represent data that do not have a common schema and are not effectively managed by a conventional database management system. For example, data contained in email messages, HTML files, XML files, MS Office files, etc. may represent part of the unstructured data of an organization. Unstructured data may represent the majority of data of a typical organization.

Organizations today face various challenges related to data/information management. For example, increased digitized content, retention of data due to regulatory requirements, the prevalence of productivity tools, the availability of data on communication networks, and other factors have been driving rapid growth of data volumes in organizations. In response to the rapid data growth, most organizations have been expanding data storage. However, most organizations have had difficulties efficiently, effectively, and economically managing and utilizing data stored in data storage, especially unstructured data.

Unstructured data are typically scattered across networks and practically invisible to database management system of organizations. At the same time, unstructured data may contain data that are crucial to the operation, reputation, interests, and even existence of an organization. In an example, an organization may need to timely find a certain piece of information in unstructured data for litigation support. In another example, an organization may need to timely identify privacy data in unstructured data for protection of customer privacy and security. In another example, an organization may need to timely identify data pertaining to design concepts in unstructured data for protection of intellectual property. The failure of an organization to timely identify, find, and/or retrieve necessary information from unstructured data may result in significant damage to the organization and related parties.

Some techniques have been employed for managing data. However, the existing techniques have various disadvantages. For example, to prevent unstructured data, an organization may store data in secure, closely monitored databases and may have strict procedures and policies governing how users (e.g., employees) handle and store data. However, the procedures and policies may impose significant burden on users, and therefore may reduce the productivity and efficiency of the users. Further, there may be no systematic way to validate that the procedures and policies are followed. As a result, the organization may still have a significant amount of unstructured data that cannot be efficiently and effectively utilized.

In another example, an organization may deploy search engines for finding information in unstructured data. However, the deployment of the search engines may typically require customization of search parameters, and therefore may require a significant amount of consultant hours and a long lead time to implement. Changes of the search parameters may be costly and time-consuming. The searches may involve a substantial amount of manual processes (e.g., coding), and the searches may not be efficient enough to timely deliver useful results.

SUMMARY OF INVENTION

An embodiment of the present invention relates to a system for facilitating management of content data contained in a plurality of files. The system may include a data discovery program configured to scan context data pertaining to the content data. The data discovery program may be configured to scan the context data without accessing the content data. The system may also include logic (e.g., implemented in the data discovery program or a service profile program) configured to determine one or more service profiles. The one or more service profiles may be selected and/or determined by a user or determined based on one or more rules and the current state of the context data. The one or more service profiles may define one or more services to be performed on at least one of one or more files among the plurality of files and at least a portion of the content data and/or the context data.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a system for facilitating management of content data contained in a plurality of files. The system may include a data discovery program configured to scan context data pertaining to the plurality of files, in one or more embodiments, without accessing the content data. The system may also include logic (or a service profile program) configured to determine one or more service profiles. The one or more service profiles may be determined based on one or more rules and the context data. The one or more service profiles may define one or more services to be performed on at least one of one or more files among the plurality of files and at least a portion of the content data.

For example, the one or more services may include extracting metadata from the content data. The metadata may include one or more of new context data, search index/indexes, and database index/indexes. In another example, the one or more services may include moving, copying, and/or deleting the one or more files.

The system may further include one or more service provider programs configured to perform the one or more services. In one or more embodiments, the one or more service provider programs may perform the one or more services on the content data without accessing the context data. The system may further include one or more fetcher programs configured to retrieve the one or more files. The system may further include one or more additional data discovery programs.

In one or more embodiments, the data discovery program, the one or more fetcher programs, and the one or more service provider programs operate on the same batch of data sequentially and operate on different batches of data simultaneously.

In one or more embodiments, the one or more service providers operate in different nodes in a cluster.

One or more embodiments of the present invention relate to a method for facilitating management of content data contained in a plurality of files. The method may include scanning context data pertaining to the content data. The method may also include determining one or more service profiles based on user input, one or more rules, and/or a state of the context data. The one or more service profiles may define one or more services to be performed on one or more files among the plurality of files, at least a portion of the content data, and/or at least a portion of the context data.

One or more embodiments of the present invention relate to a method for searching data contained in a plurality of files. The method may include performing a full-text search of a set of files. The set of files may include at least one of one or more files of the plurality of files and one or more files not belonging to the plurality of files. The method may also include creating a pattern based on one or more results of the full-text search. The method may further include searching the plurality of files based on the pattern. For example, the pattern may include one or more keywords or number formats selected based on the full-text search.

The features and advantages of the invention may be better understood with reference to the figures and discussions that follow.

Figure 1:
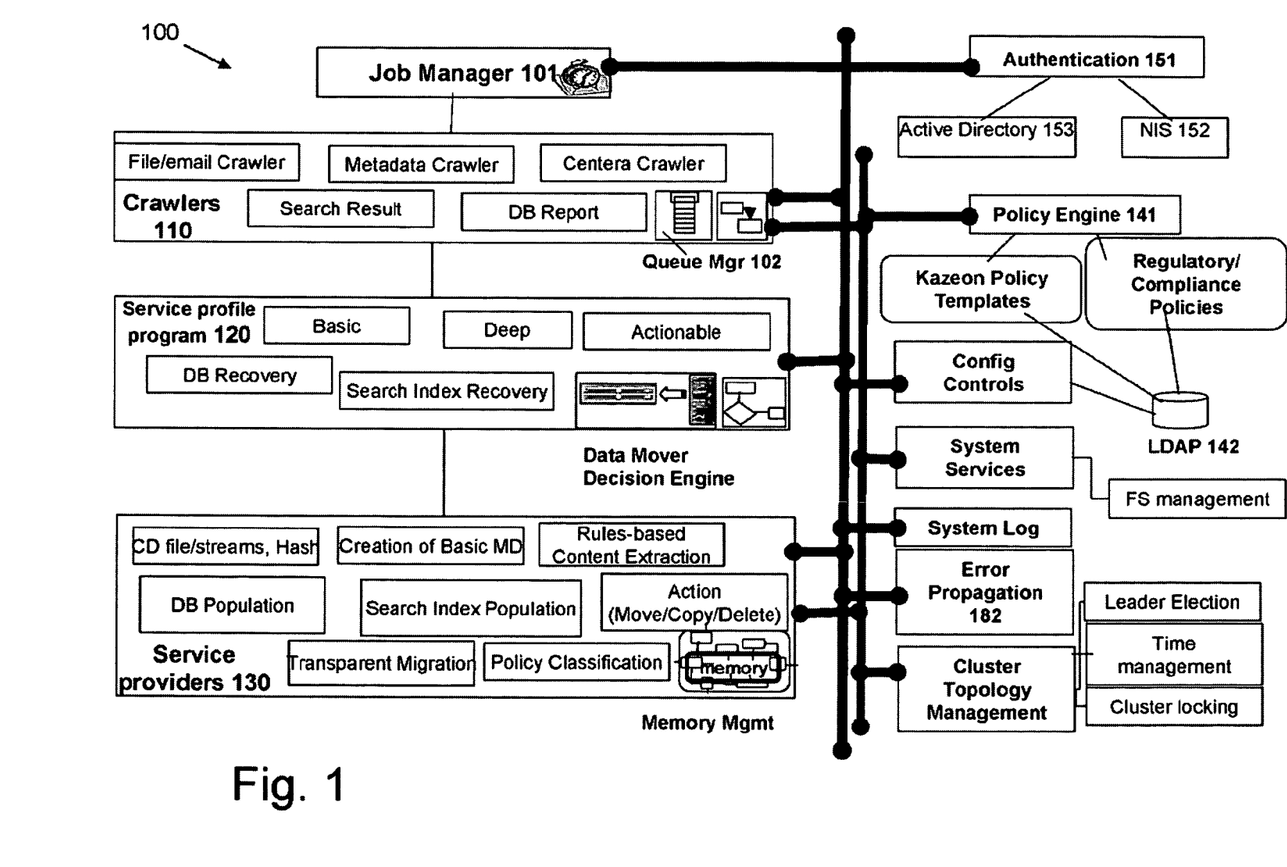
FIG. 1 shows a block diagram illustrating a system for managing and handling data (e.g., unstructured data) in accordance with one or more embodiments of the present invention.

FIG. 1 shows a block diagram illustrating a system 100 for managing and handling data (e.g., unstructured data) in accordance with one or more embodiments of the present invention. System 100 may include data path modules/programs, such as job manager 101, one or more data discovery programs/crawlers (e.g., crawlers 110), one or more service profiles, and one or more service providers 130.

Job manager 101 may be configured to perform one or more of job scheduling, crawling management, and failover management.

Job scheduling may involve allowing a user to start/stop/monitor data processing jobs. Job manager 101 may accept user input through a CLI/GUI. For starting jobs, job manager 101 may spawn a crawler in an appropriate node. For stopping/monitoring jobs, job manager 101 may interact with a queue manager 102.

Job manager 101 may schedule jobs on a periodical basis or based on a calendar. A main task of these jobs may be to walk through a file hierarchy (local or remote) by utilizing one or more crawlers to perform various functions on selected objects.

The distribution of files to be processed according to the functions may be performed utilizing a set of centralized queues managed by queue manager 102. Queue manager 102 may be implemented in job manager 101, coupled to job manager 101, and/or implemented in a node. Queue manager 102 may distribute the files/load in separate service providers 130 that manage the workflow.

The one or more data discovery programs/crawlers 110 may include one or more of file/email crawler(s), metadata crawler(s), Centera™ crawler(s), search result logic, database result logic, etc.

In accordance with one or more embodiments of the invention, a crawler (or data discovery program) may include logic for performing the tasks of enumerating a source data set and applying any filters/policies as required for determining the objects (or files) that are eligible candidates for processing. The crawler may scan files according to one or more of NFS (Network Filesystem) and CIFS (Common Internet Filesystem) protocols. The crawler may then feed the list of eligible objects (or files) along with a service profile (among service profiles 120, e.g., determined by logic implemented in the crawler or implemented in a service profile program) that needs to be applied on the eligible objects as service items to queue manager 102. A crawler in accordance with one or more embodiments of the invention may be configured to scan only context data without accessing content data, and may advantageously operate with higher efficiency than a conventional "crawler" that is well-known in the art. Further, the crawler according to the invention may classify unstructured data (or files containing unstructured data) according to context data.

A crawl may perform, for example, one or more of the following functions on selected objects: data integrity of filesystems at the object (file) level, nearline, cataloguing (often referred to as shallow or basic classification), and deep parsing. Nearline may involve copying of the object (file) to another location (usually in some location inside one or more filesystems). Cataloguing may involve extracting the user/environmental parameters of selected documents/files present at the remote filesystems and creates a unique fingerprint of the document. Deep parsing may involve analyzing the objects (files) based on a set of keyword-based, regular-expression-based or semantic-based rules.

A crawler may be started by job manager 101 (or a scheduler implemented in or coupled to job manager 101) and may be stopped either by job manager 101 (or the scheduler) or may self-terminate based on scheduling specifications. In case of node failure, a crawler may obtain a restart point from queue manager 102. The crawler can be agnostic about the node in which queue manager 102 is running.

The number of crawlers 110 may be adjusted (e.g., increased or decreased) according to the number and/or volume or repositories.

The one or more service profiles 120 may include one or more of basic classification, deep classification, data integrity, database recovery, search index recovery, action(s) (e.g., move, copy, and/or delete), etc. A service profile may define one or more services or orders and combinations of services provided by one or more of service providers 130 for data to be processed. Multiple services may be mixed and matched by a service profile.

The one or more service providers 130 may be configured to perform one or more of context data population, creation of (basic) metadata, database population, rule-based content extraction, transparent migration, policy classification, action(s) (e.g., move, copy, and/or delete), etc. in processing data/file(s).

System 100 may also include control path modules/programs such as authentication module 151 and policy engine 141.

Authentication module 151 may be configured to authenticate users (utilizing an NFS or CIFS interface) and application servers (utilizing an API). Authentication module 151 may authenticate a user during connection establish time. Authentication module 151 may perform the mapping of user IDs and predefined security IDs into user names. Authentication module 151 may perform authentication by linking and invoking a library, such as in NIS server 152 (Network Information Services server 152, e.g., for UNIX systems) or in active directory server 153 (e.g., for Windows systems). The library may take the username and password credentials and attempt to authenticate the user against one or more authentication services.

Policy engine 141 may include a management part that stores and manages the policies into a LDAP repository 142 (Lightweight Directory Access Protocol repository 142, or LDAP 142).

Policy engine 141 may also include policy enforcement modules. For example, Policy engine 141 may include one or more of the following enforcement modules: an access control enforcer (ACE) module, a parsing rules module, a search policy module, etc.

The ACE module may be configured to enforce one or more of access control rights, file retention policies, WORM (write-once-read-many), etc. The ACE module may interfaces with CIFS, APIs (application interfaces), etc.

The parsing rules module may employ document parsing rules managed by policy engine 141 in LDAP 142 to extract relevant information from documents. These parsing rules may be based on at least one of keyword, regular expression, Boolean logic, and advanced content analytics. An option to have full-content extraction also may be provided.

The search policy module may perform the lookup to identify whether a particular user should view the search results of a search query. The search policy module may interface with a search engine.

The implementation of policy engine 141 may be based one or more concepts, such as the categorization of information based on the content, the actions (or services) associated with different policy groups, etc.

System 100 may employ rules to identify and categorize the content data in an enterprise/organization. The rules may be arbitrary regular expressions along with one or more actions (or services) specified. Each rule can be assigned a name. Different set of rules may be applicable to different set of objects. The actions (or services) that can be specified utilizing policy engine 141 (or a rule engine) may include key-value pairs.

Policy engine 141 may be configured to categorize data into different buckets. The categorization may be useful for identifying contents that need regulatory compliance. For example, a rule may be that any document with content of "social security number" or "SSN" or "xxx-xxx-xxxx" where x is a digit [0, 9] should be categorized as HIPAA (Health Insurance Portability and Accountability Act). This rule may be formulated as a regular expression, and the action (or service) may be specified to map the group to appropriate regulatory policy in context data. Context data will be discussed with reference to FIGS. 2 and 3.

The rules may be stored in LDAP 142. A parser engine may download the one or more of the rules before parsing any file. The content of the file may then be matched with the specified rule, and appropriate memberships may be assigned.

Policy engine 141 may also define a policy group (including one or more rules) in context data. A policy group may represent an abstraction that stores the enforcement rules applicable for a given policy group. For example, HIPAA may correspond to 7 year enforcement with rigid ACLs (Access Control Lists) specific to the organization, and SEC (Securities and Exchange Commission) may have 5 year enforcement with loose deletion requirement. Furthermore these regulatory requirements may change over time. Therefore, the context data of each object stores the policy group it belongs to, but the consequence of belonging to this group is maintained in the policy grouping information in LDAP 142.

The enforcement modules (e.g., the ACE module, the parsing rules module, and the search policy module) consult the requirements and take appropriate action on the object at appropriate time.

System 100 may also include housekeeping modules such as a system services module, a system log module, an error propagation module 182 (for propagating error information across the nodes), etc.

Figure 2:
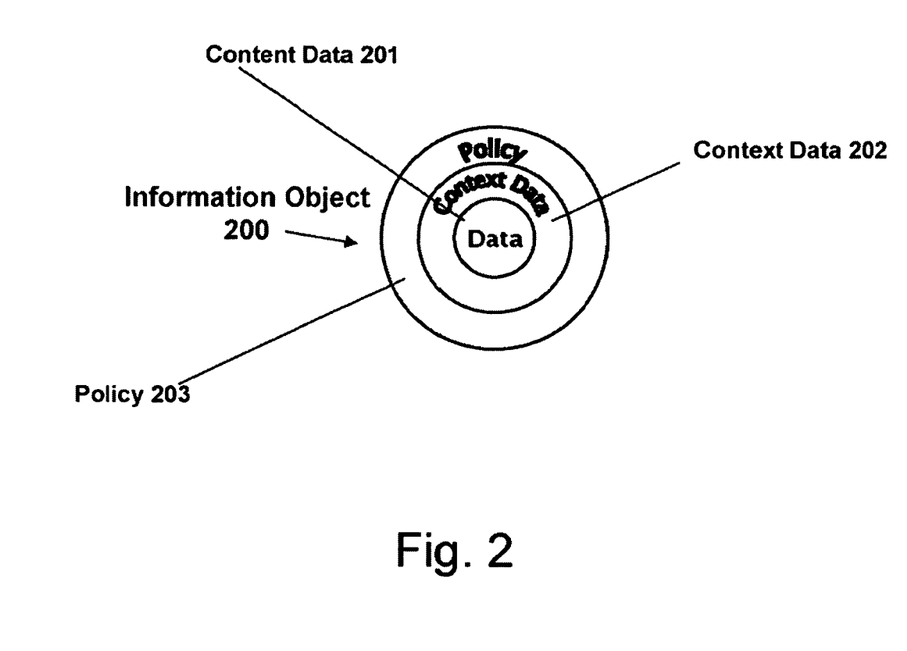
FIG. 2 shows a schematic representation of an information object including content data, context data, and policy in accordance with one or more embodiments of the present invention.

FIG. 2 shows a schematic representation of an information object 200 including content data 201, context data 202, and policy 203 in accordance with one or more embodiments of the present invention.

Content data 201 may represent data contained in unstructured document (e.g., PowerPoint presentation) created by a user. Content data 201 may also represent data contained in a semi-structured message (e.g., an email message). Content data 201 may also represent a structured record generated by an application. Any of the unstructured document, semi-structured message, and structured record may be converted into an information object, e.g., information object 200, in accordance with one or more embodiments of the present invention.

Context data 202 may be bound to (or associated with) content data 201 by a context data manager module configured to read, write, and/or modify context data 202. Context data 202 may include data that are indexed or derived, such as one or more of unique finger-print(s) for global identification, file attribute(s) (e.g., vcprez, .ppt, Jul. 7, 2004, John Smith, etc.), keyword(s) (e.g., TAM, confidential, etc.), classification(s) (e.g., business critical, confidential, customer info, etc.), owner (e.g., Marketing, John Jacobs, etc.), location (e.g., IP addr., Mount pt., file path such as c:\userA\mydocs\projects, Server name, etc.), etc. Context data 202 may include data that are injected by IT staff or system(s), such as one or more of project name(s) (e.g., Project Gamma, etc.), classification(s) (e.g., draft, final, etc.), etc.

Context data 202 may be an integral part of information object 200, or a reference (fixed) content object. Context data 202 may describe the aspect of information object 200 that is not an explicit part of content data 201. Context data 202 may enable efficient grouping, clustering, and/or advanced processing on content data 201 that is not possible otherwise.

The architecture of context data 202 may include a tight content-context binding (i.e., a tight binding between content data 201 and context data 202). There may be multiple ways in which the relationship between context data 202 and content data 201 can be defined. For example, there may be only one context data 202 provided for each instance of information object 200. Accordingly, multiple identical objects may have only one copy of content data 201 stored in an object (e.g., information object 200) and the rest of the objects may contain only links. Nevertheless, one context data may be maintained for each instance of the object (or each of the identical objects).

Flexibility may be provided for creating multiple maps including abstract context that are associated with group IDs. Several types of context data binding arrangements may be defined, for example, tightly paired context, shared context, abstract context, shared content, etc. Tightly paired context may represent a one-to-one relationship with a content associated with a context. Shared context may represent a one-to-many relationship with a context common to many objects. Abstract context may represent a context associated with group identifiers (IDs) and not referring to any content in particular. The context may have no association with any particular object, though the context may reflect some common properties of a plurality of objects (or files). The abstract context may represent a one-to-none relationship. Shared content may represent a many-to-one relationship. An abstract context may be utilized when multiple contents are identical but have different context attributes thus resulting in many context data sets pointing to one content data set.

A tight context-content binding is created in one or more embodiments. Tight binding may imply that given a file name or a file path, the context data associated with the content can be retrieved, and that given the context data, the corresponding content can be found.

The architecture of context data 202 may also include a context data model that specifies a plurality of context data categories. Example context data categories will be discussed with reference to FIG. 3.

Policy 203 may be provided by policy engine 141 shown in the example of FIG. 1 and may be configured to connect business rules and data. For example, policy 203 may include data pertaining to one or more of retention period(s) (e.g., 5 years, etc.), auto-deletion period(s) (e.g., 7 years, etc.), protection level(s) (e.g., weekly backup, etc.), quality of storage service(s) (e.g., class-1, etc.), version control(s) (e.g., previous 5 versions, etc.), access control(s) (e.g., corporate, etc.), etc.

Figure 3:
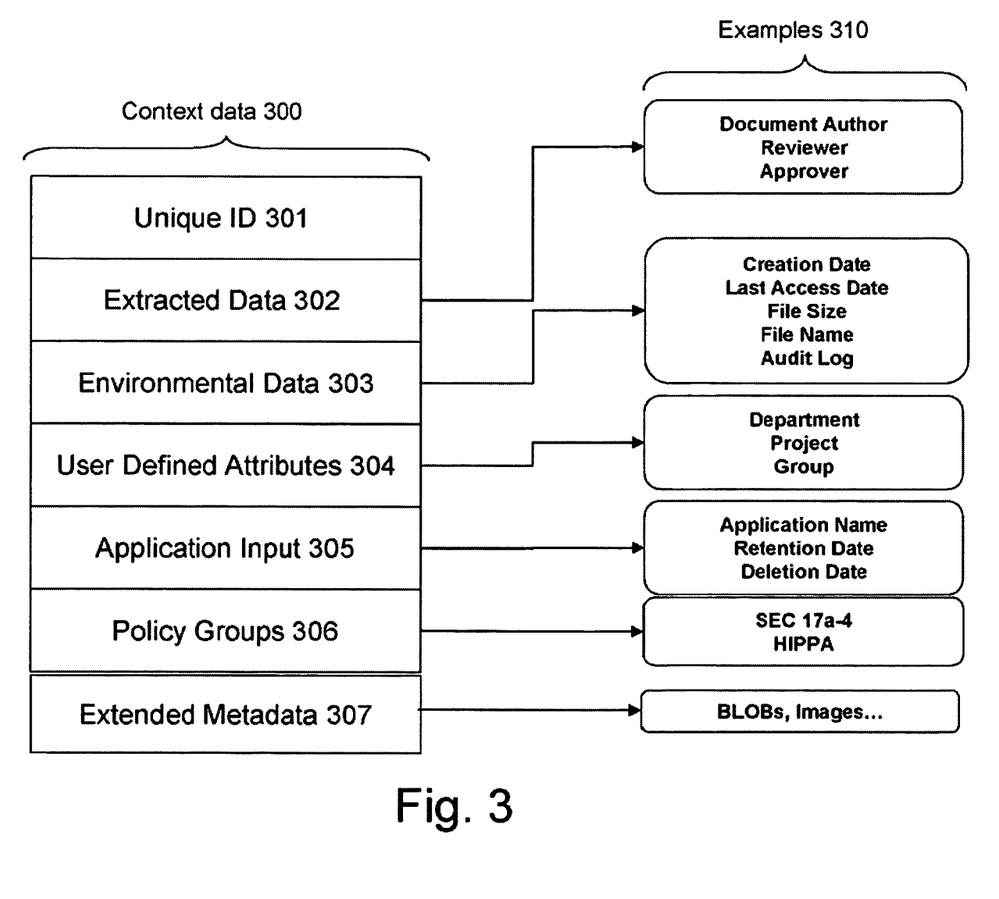
FIG. 3 shows a schematic representation of context data in accordance with one or more embodiments of the present invention.
Figure 4:
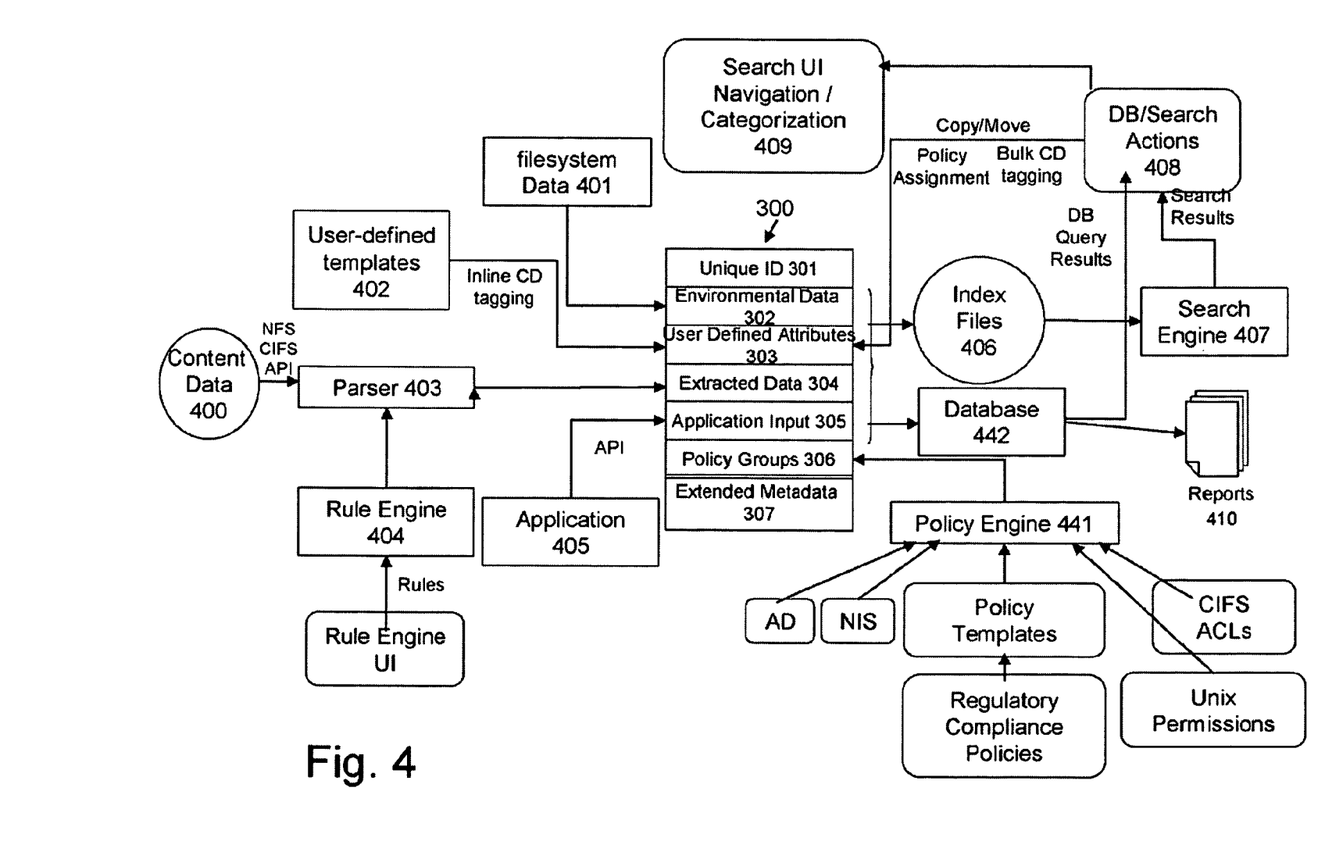
FIG. 4 shows a block diagram illustrating a context data workflow in accordance with one or more embodiments of the present invention.

FIG. 3 shows a schematic representation of context data 300 and context data examples 310 in accordance with one or more embodiments of the present invention. FIG. 4 shows a block diagram illustrating a context data workflow (e.g., extraction, association, population, and/or utilization of context data) in accordance with one or more embodiments of the present invention. The extraction, association, population, and/or utilization of context data may be performed by one or more service providers, such as the one or more service providers illustrated in the example of FIG. 1, and may be governed by policies/rules provided by one or more policy engines or rule engines and identified by one or more data discovery programs.

For example, context data may be stored as XML (Extensible Markup Language) documents. Context data may contain a plurality of elements (tags) that are specific to applications. As illustrated in the example of FIG. 3, context data fields of context data 300, may be subdivided into one or more of the following categories:

Unique ID 301 may be a combination of hash and a globally unique identifier. It is explained in more details in the next subsection. Unique ID 301 may be utilized for authentication and/or authorization purposes.

Extracted data 302 may represent parameters that parser 403 extracts from content data 400 by parsing content data 400 and applying predefined rules provided by rule engine 404. For example, extracted data 302 may include data pertaining to one or more of document author, reviewer, approver, etc.

Environmental data 303 may include data pertaining to one or more of filesystem data 401, such as creation date, author, and last access date, file size, file name, audit log, etc. Environmental data 303 may also correspond to the policy and other grouping information about the concerned object.

User defined attributes 304 may represent information (or user IQ) inserted by users utilizing, for example, user-defined templates 402 and/or inline tagging. For example, user defined attributes 304 may include data pertaining to one or more of department, project, group, etc. User defined attributes 304 may also include information, such as policy assignment, tags, etc., resulted from DB/search actions 408.

Application input 305 may represent metadata and/or parameters input/populated by application 405 through an API. For example, Application input 305 may include data pertaining to one or more of application name, retention date, deletion date, etc.

Policy groups 306 may include (IDs) of zero or more groups that a context data object belongs to. Examples of the IDs may include one or more of SEC 17a-4, HIPPA, etc. The IDs and related policies may be provided by policy engine 441. Policy groups 306 may provide a way to create a set of context data objects that share common policies (user/data roles), and/or attributes (key/value pairs). In addition, any group context data object may belong to other group objects. Hierarchical relationships among context data sets may be implemented.

Extended metadata 307 may include one or more of additional metadata, custom tags, BLOBs (Binary Large Objects), policies, images, etc. included in a context data object.

Environmental data 302, user defined attributes 303, extracted data 304, application input 305, etc. may be stored in database 442 and utilized to generate index files 406 for supporting reporting performed by database 442. Environmental data 302, user defined attributes 303, extracted data 304, application input 305, etc. may also be stored in database 442 for generating report 410 and for supporting DB/search actions 408.

DB/search actions 408 based on search results of search engine 407 may update user defined attributes 303 and may update search user interface, navigation, and/or categorization 409. Accordingly, one or more feedback loops may be formed such that context data 300 may be updated and refined. As a result, effectiveness and efficiency of the searches performed by search engine 407 may be advantageously improved.

In one or more embodiments, search engine 407 may perform a full-text search of a plurality of files. A pattern may be created based on one or more results of the full-text search. For example, the pattern may include one or more keywords or number formats selected based on the full-text search. The plurality of files and/or other files may be searched based on the pattern with improved efficiency.

Some prior art search solutions are based on environmental attributes. Some prior art search solutions are based on full text. One or more embodiments of the invention scan context data and may be more efficient and more effective than the prior art solutions.

Figure 5:
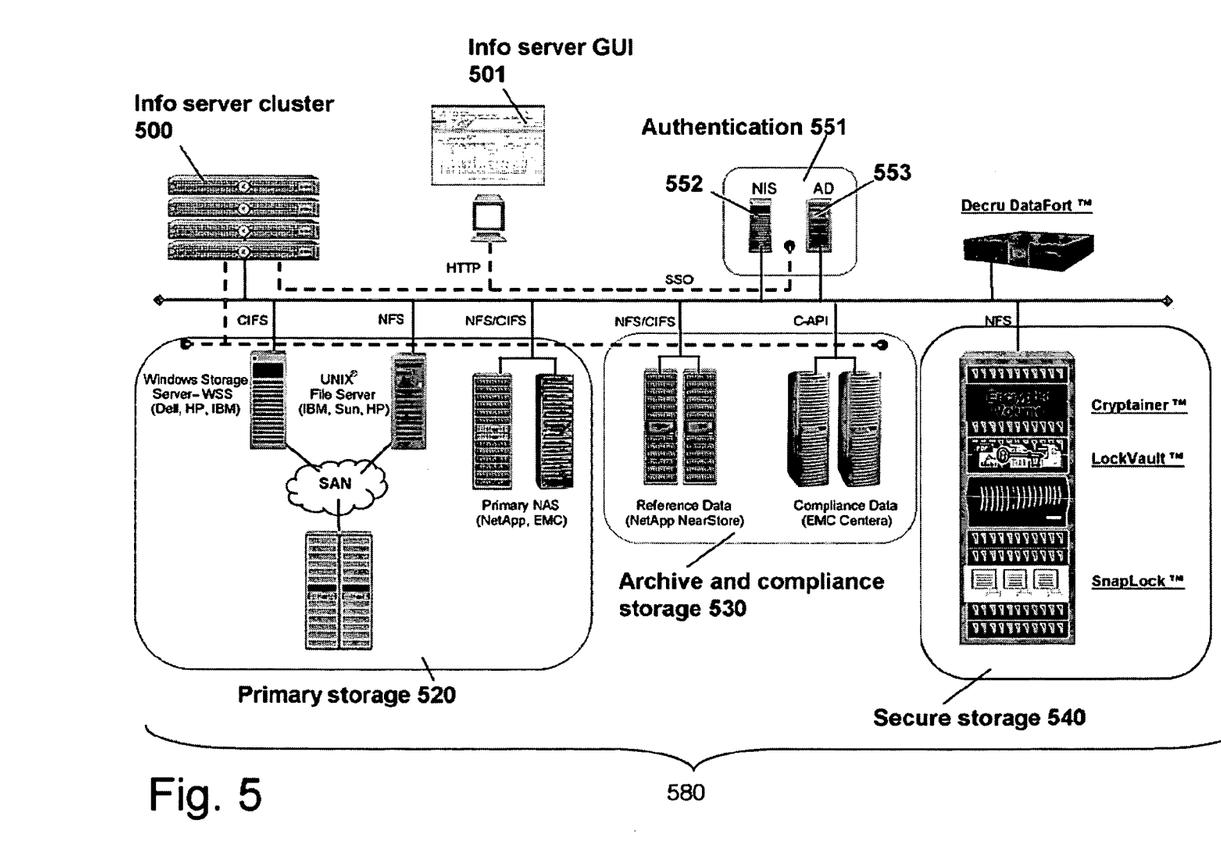
FIG. 5 shows a block diagram illustrating an arrangement for data management in accordance with one or more embodiments of the present invention.

FIG. 5 shows a block diagram illustrating an arrangement 580 for data management in accordance with one or more embodiments of the present invention. Arrangement 580 may include information server cluster 500 for handling data. Information server cluster 500 may include a job manager and a queue manager, such as job manger 101 and queue manager 102 illustrated in the example of FIG. 1. Information server cluster 500 may include one or more data discovery programs/crawlers, such as crawlers 110 discussed with reference to FIG. 1. Information server cluster 500 may also contain one or more service profiles and service providers, such as service profiles 120 and service providers 130 discussed with reference to FIG. 1.

Arrangement 580 may also include an information server GUI 501 for configuring and operating information server cluster 500. Arrangement 580 may also include authentication servers 551 such as NIS server 552 and active directory server 553 for performing authentication functions to protect security.

The crawlers of information server cluster 500 may scan files contained in the one or more storage/file servers in one or more of primary storage 520, archive and compliance storage 530, and secure storage 540 utilizing one or more of NFS (Network Filesystem) and CIFS (Common Internet Filesystem) protocols. Information server cluster 500 may be logically decoupled from the data storages. The crawlers may reside in information server cluster 500, and no agent needs to be installed in the storage/file servers. Further, an external data store may be employed to store context data. Accordingly, impact on existing data storages may be minimized or prevented.

Information server cluster 500 may support ACLs (Access Control Lists) and may be a stateless appliance such that protection of data security may be reinforced.

Information server cluster 500 may contain pre-installed software (e.g., crawlers, service providers, etc.) and may be easy to install. The data associated with setting up and configuring information server cluster 500 in arrangement 580 may represent out-of-band data and may be separate from other data associated with accessing the primary storage 520, archive and compliance storage 530, and secure storage 540. Advantageously, during installing and configuring information server cluster 500, there may be no disruption to utilization or applications in arrangement 580, and no separate repository needs to be created.

Figure 6:
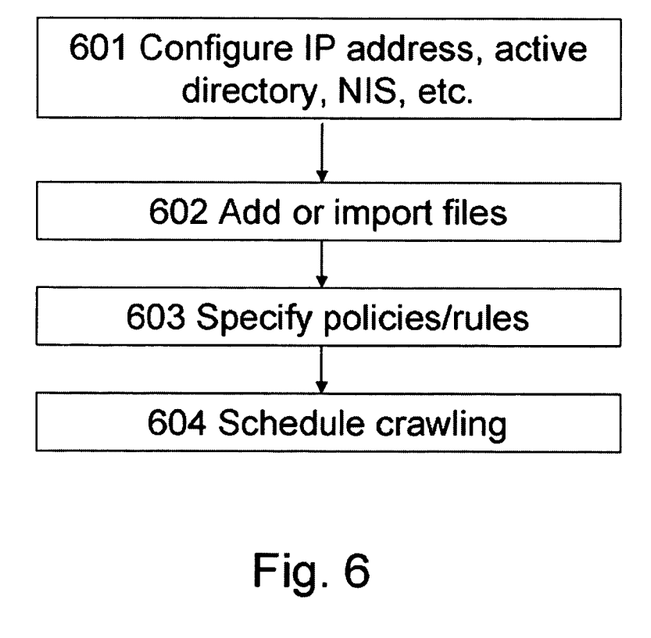
FIG. 6 shows a flowchart illustrating a process for setting up an arrangement for data management in accordance with one or more embodiments of the present invention.

FIG. 6 shows a flowchart illustrating a process for setting up arrangement 580 (illustrated in the example of FIG. 5) in accordance with one or more embodiments of the present invention. The process may start with step 601, in which an administrator may configure IP addresses, NIS server 552 (illustrated in the example of FIG. 5), active directory server 553 (illustrated in the example of FIG. 5), etc.

In step 602, the administrator may add or import files that need to be classified.

In step 603, the administrator may specify policies, such as policies for information tagging, data migration, categorization, etc.

In step 604, the administrator may schedule jobs, such as scanning only filesystem metadata, deep content parsing, checking data integrity, performing data recovery etc.

The process may be simple enough such that neither consultant nor customization of classification/search parameter is needed. Advantageously, setting up arrangement 580 may be cost-effectively completed in short time.

Figure 7:
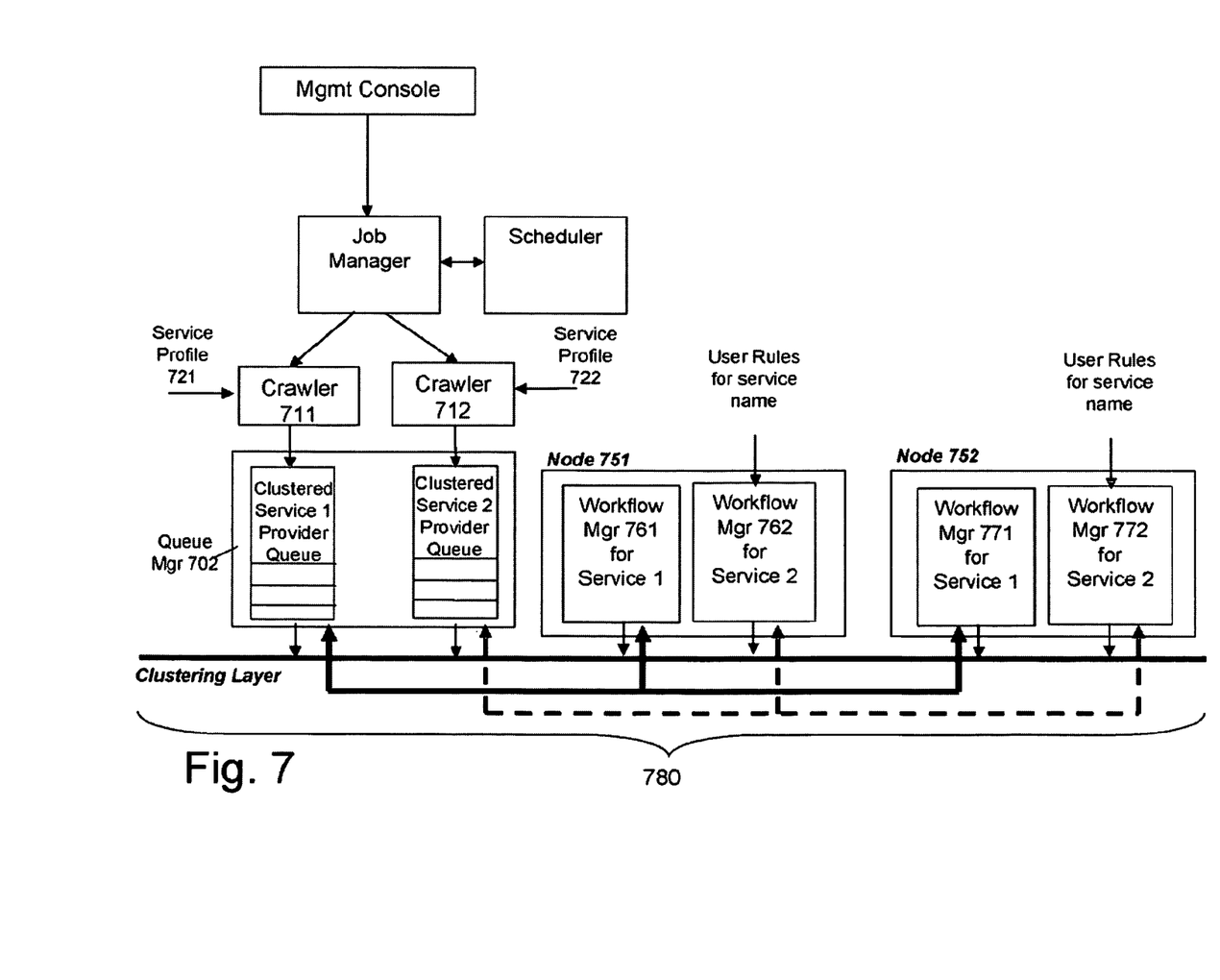
FIG. 7 shows a block diagram illustrating a scalable arrangement for managing and handling data in accordance with one or more embodiments of the present invention.

FIG. 7 shows a block diagram illustrating a scalable arrangement 780 for managing and handling data in accordance with one or more embodiments of the present invention. Arrangement 780 may include a plurality of clustered nodes (i.e., logical placeholders or memory blocks for data), such as node 751 and node 752, for service distribution, load balancing, redundancy, fail-over, etc. Each node may include one or more workflow manager programs, such as workflow manager 761 for service 1, workflow manager 762 for service 2, workflow manager 771 for service 1, and workflow manager 772 for service 2, corresponding to one or more services.

A workflow manager may be launched on demand to process objects for a specific job queue and service profile combination. A workflow manager may receive job requests from a queue manager 702. A workflow manager may manage one or more service providers to perform all the processing (e.g., classification) as required by the service profile (e.g., service profile 721 or 722), and may communicate the outcome of the processing back to the queue manager 702.

The processing may be performed by calling APIs from a service library. If a given job requires data to be moved from a source storage, a service provider may request a data mover program to transfer the data to a temporary local storage. While the service provider is processing the data from the temporary local storage, the workflow manager may get the next job request (or next batch of work units) from queue manager 702, and may submit the job request to the data mover in an attempt to start a pipeline of I/O and processing.

A workflow manager may provide the processing of a job request based on a service profile (e.g., service profile 721 or 722) specified during crawling performed by crawlers (e.g., crawler 711 or 712). The workflow manager may opens the context data of a file that is undergoing the processing and may pass the file handle to each service provider as needed.

According to the clustered arrangement, the processing pertaining to a particular service (e.g., service 1) may be distributed among a plurality of nodes (e.g., nodes 751 and 752). The nodes may retrieve data independently, and there may be no congestion of data flow. Since nodes may perform the processing in parallel, arrangement 780 may provide high efficiency. Further, the number of nodes may be adjusted according to the requirement of data processing. For example, if more data need to be processed utilizing a particular service, more nodes may be added. Advantageously, arrangement 780 may be flexible and scalable in response to the volume of data to be processed.

Figure 8:
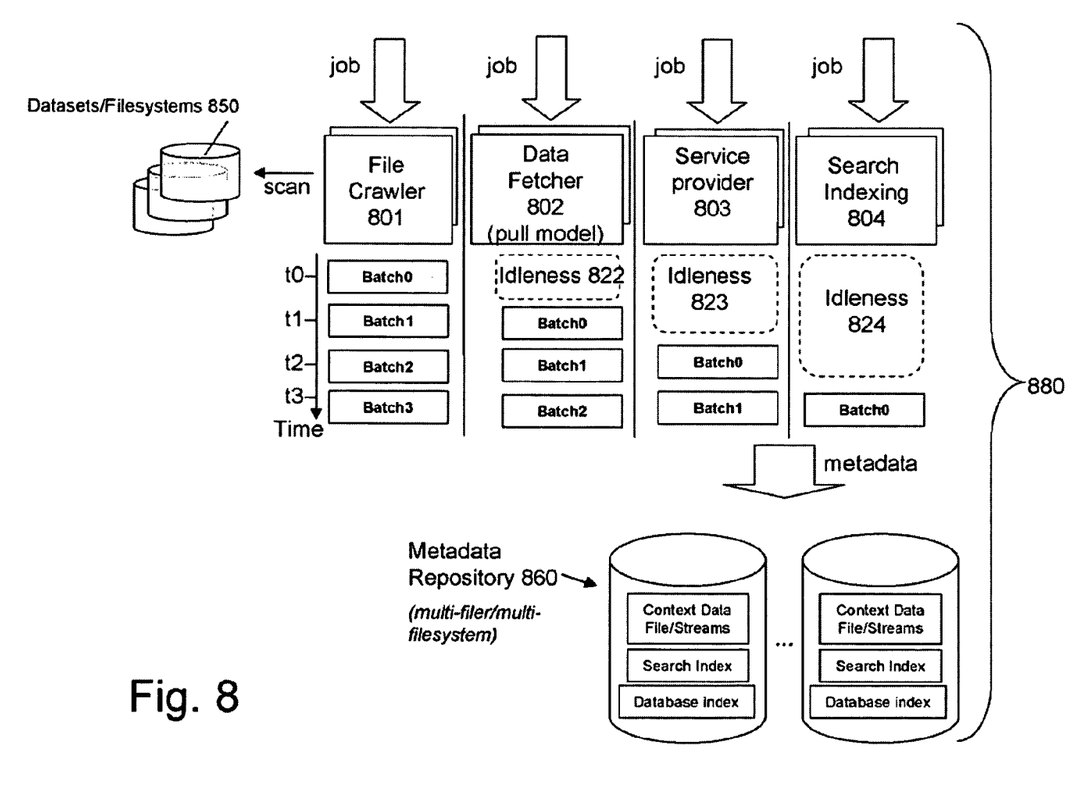
FIG. 8 shows a schematic representation of an arrangement for generating metadata in accordance with one or more embodiments of the present invention.

FIG. 8 shows a schematic representation of an arrangement 880 for generating metadata in accordance with one or more embodiments of the present invention. Arrangement 880 may include file crawler(s) 801 (or data discovery program(s) 801), data fetcher(s) 802, service provider(s) 803, and search indexing program(s) 804 configured to operate on the same batch of data/files sequentially and to operate on different batches of data/files simultaneously.

For example, at time=t0, file crawler 801 may scan batch 0 in datasets/filesystem 850, while data fetcher 802, service provider 803, and search indexing program 804 may be idle.

Subsequently, at time=t1, file crawler 801 may scan batch 1, data fetcher 802 may fetch batch 0 according to service profile(s) identified by file crawler 801, and service provider 803, and search indexing program 804 may be idle.

Subsequently, at time=t2, file crawler 801 may scan batch 2, data fetcher 802 may fetch batch 1, service provider 803 may perform data processing on batch 0 (e.g., extracting context data) according to the service profile(s), and search indexing program 804 may be idle.

Subsequently, at time=t3, file crawler 801 may scan batch 3, data fetcher 802 may fetch batch 2, service provider 803 may perform data processing on batch 1, and search indexing program 804 may extract search index/indexes from batch 0.

The metadata generated by service provider 803 and search indexing program 804, such as context data and search indexes, may be deposited in metadata repository 860.

Initially, there may be idle capacity, such as idleness 822, idleness 823, and idleness 824 at t0, t1, and t2, which may represent a short and negligible period of time. The capacity of all of crawler 801, data fetcher 802, service provider 803, and search indexing program 804 may be fully utilized from t3 on.

Although batches 0-3 appear to be of the same size in the example of FIG. 8, the different batches do not need to have the same size. Arrangement 880 may be optimized in accordance to factors such as batch sizes, memories and processing resources available to each of crawler 801, data fetcher 802, service provider 803, and search indexing program 804, etc.

By decoupling functions, such as crawling (or data discovery), fetching, data processing, and search indexing, capacity of each program may be fully utilized in parallel. Advantageously, arrangement 880 may provide high performance/efficiency for processing data, such as for generating metadata discussed above.

As can be appreciated from the foregoing, embodiments of the present invention may represent data management systems that can be easily and economically deployed in short time. Further, embodiments of the present invention may advantageously enable management and utilization of data (e.g., unstructured data) without relying on any particular schema or predefined data fields. Moreover, embodiments of the present invention may advantageously enable management and utilization of data with flexibility, scalability, efficiency, effectiveness, and security.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A system for facilitating management of content data contained in a plurality of files stored on a data storage server, the system comprising:
   a server cluster that comprises one or more processors and a non-transitory computer readable medium storing a plurality of instructions, which when executed, cause the one or more processors to:
   implement a discovery program configured to scan an information object of each of the plurality of files, without accessing the content data of the information object of each of the plurality of files scanned, to obtain context data from the information object of each of the plurality of files scanned;
   implement a service profile program configured to:
      retrieve the plurality of files stored on the data storage server for servicing;
      select one or more service profiles stored on the server cluster, the selecting of the one or more service profiles being based on one or more rules to identify and categorize the content data and the selecting being further based on a state of the context data, wherein each service profile defines a plurality of services to be performed on the retrieved plurality of files, the plurality of services being performed on at least a portion of the content data and at least a portion of the context data of each of the retrieved plurality of files, and wherein the plurality of services included in the selected one or more service profiles includes extracting metadata from the content data, database population, rule-based content extraction, transparent migration, and policy classification;
      distribute each of the retrieved plurality of files at an object level to one of a plurality of nodes of the server cluster to perform the plurality of services included in the selected one or more service profiles, the services being performed sequentially on the same file and simultaneously on different files of the retrieved plurality of files;

implement one or more service provider programs configured to perform the one or more services; and implement a search indexing program configured to generate search indexes using the context data, wherein the data discovery program, the one of the one or more service provider programs, and the search indexing program operate on a same data batch sequentially and operate on different data batches simultaneously.

2. The system of claim 1 wherein the discovery program is further configured to select the plurality of files.

3. The system of claim 1 wherein the context data is configured to enable the content data to be found, and the context data is configured to be retrieved using at least one of a file name and a file path pertaining to the content data.

4. The system of claim 1 wherein the context data comprises a context data set, the context data set being configured to point to a content data set in the content data.

5. The system of claim 1 wherein the context data comprises a context data set, the context data set being configured to point to multiple files among the plurality of files.

6. The system of claim 1 wherein the context data comprises a plurality of context data sets, the plurality of context data sets being configured to point to one content data set in the content data.

7. The system of claim 1 further comprising a policy engine configured to associate the one or more rules with the at least one of the one or more files among the plurality of files, the at least the portion of the content data, and the at least the portion of the context data.

8. The system of claim 1 wherein the discovery program is configured to scan the context data with file paths associated with the content data being maintained and without any file path associated with the content data being changed.

9. The system of claim 1 wherein the one or more service provider programs are configured to perform the one or more services without any file path associated with the content data being changed.

10. The system of claim 1 wherein the one or more service provider programs operate in different nodes in a cluster.

11. The system of claim 1 wherein the one or more service provider programs include a first service provider residing in a first node for providing a first service and a second service provider residing in a second node for providing the first service.

12. The system of claim 1 further comprising:
a search user interface configured to receive the user input;
a search engine configured perform a search in a first set of files using at least one of the user input and one or more search indexes generated using the context data; and
search action logic configured to update one or more user defined attributes in the context data based on a result of the search.

13. The system of claim 12 wherein the search action logic is further configured to update the search user interface based on the result of the search.

14. The system of claim 12 further comprising pattern logic configured to create a pattern based on the result of the search, wherein the search engine is further configured to perform another search in a second set of files using the pattern.

15. The system of claim 1 wherein the metadata includes at least one or more of new context data, one or more search indexes, and one or more database indexes pertaining to the plurality of files.

16. The system of claim 1 wherein the context data are associated with a group identifier associated with the content data without being directly associated with the content data.

17. The system of claim 1 wherein the context data include one or more policy group identifiers associated with one or more policy groups that the context data belong to.

18. The system of claim 1 wherein a first set of data required for configuring the discovery program is separated from a second set of data associated with accessing a storage that stores the plurality of files.

19. A computer-implemented method for facilitating management of content data contained in a plurality of files stored on a data storage server, the method comprising:
scanning, by a discovery program on a server cluster that comprises a processor and memory, an information object of each of the plurality of files, without accessing the content data of the information object of each of the plurality of files scanned, to obtain context data from the information object of each of the plurality of files scanned;
retrieving the plurality of files stored on the data storage server for servicing;
selecting, by the discovery program, one or more service profiles stored on the server cluster based on i) one or more rules to identify and categorize the content data and ii) a state of the context data, wherein each service profile defines a plurality of services to be performed on the retrieved plurality of files, the plurality of services being performed on at least a portion of the content data and at least a portion of the context data of each of the retrieved plurality of files, the plurality of services included in the selected one or more service profiles including extracting metadata from the content data, database population, rule-based content extraction, transparent migration, and policy classification;
distributing, by a queue manager program on the server cluster, each of the retrieved plurality of files at an object level to one of a plurality of nodes of the server cluster to perform the plurality of services included in the selected one or more service profiles, the services being performed sequentially on the same file and simultaneously on different files of the retrieved plurality of files;
providing, by one or more service provider programs, the one or more services;
generating, by a search indexing program, search indexes using the context data,
wherein the scanning, the retrieving, the providing and the generating are performed on a same data batch sequentially and performed on different data batches simultaneously.

20. The method of claim 19 further comprising parsing the one or more rules using at least one of Boolean logic, one or more keywords, one or more regular expressions, and content analytics.

21. The method of claim 19 further comprising associating the one or more rules with the at least one of the one or more files among the plurality of files, the at least the portion of the content data, and the at least the portion of the context data.

22. The method of claim 19 further comprising retrieving the context data using at least one of a file name and a file path pertaining to the content data.

23. The method of claim 19 wherein the providing is performed in different nodes in a cluster.

24. The method of claim 19 further comprising:
performing a search in a first set of files using at least one of the user input and one or more search indexes generated using the context data; and
updating one or more user defined attributes in the context data based on a result of the search.

25. The method of claim 24 further comprising updating a search user interface for the search based on the result of the searching.

26. The method of claim 24 further comprising:
creating a pattern based on the result of the searching; and
performing another search in a second set of files using the pattern, wherein the pattern includes at least one of a keyword and a number format.

* * * * *